Sept. 7, 1926.
J. F. POWELL
1,598,691
FASTENER
Filed Feb. 27, 1925
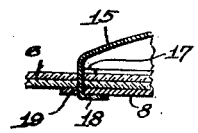
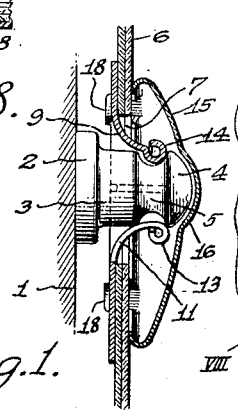
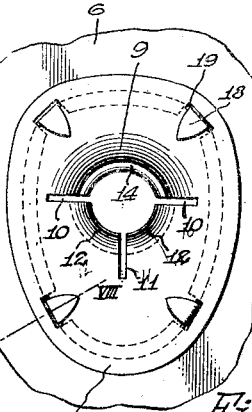
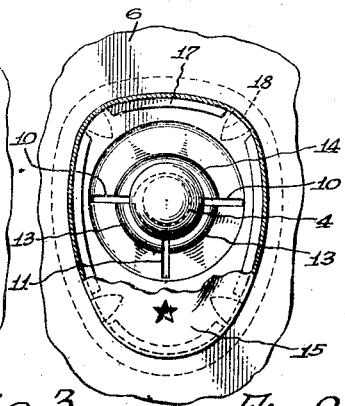
Fig.8.   Fig.1.   Fig.3.   Fig.2.
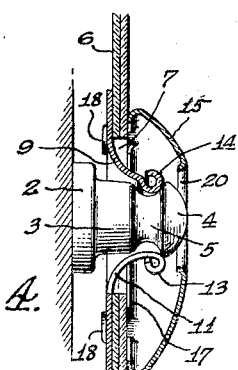
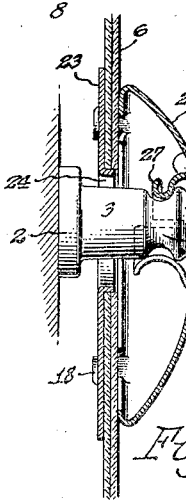
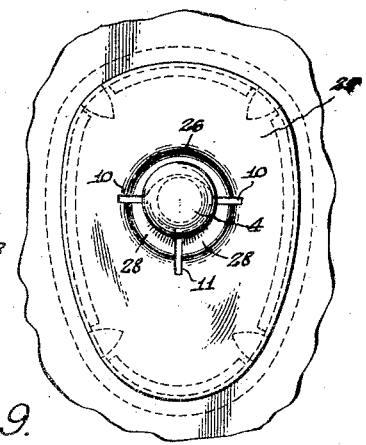
Fig.4.   Fig.9.   Fig.10.
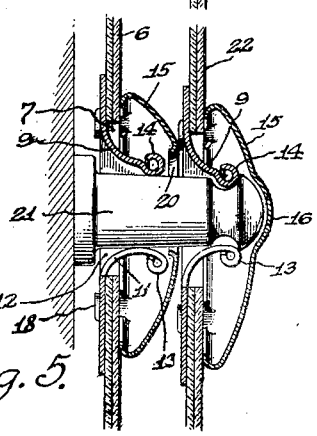
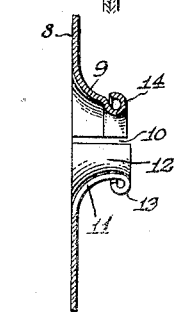
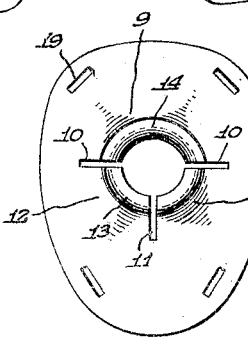
Fig.5.   Fig.6.   Fig.7.
Inventor
James F. Powell,
By
Attorneys Patented Sept. 7, 1926.

1,598,691

UNITED STATES PATENT OFFICE.

JAMES F. POWELL, OF FLINT, MICHIGAN.

FASTENER.

Application filed February 27, 1925. Serial No. 11,954.

This invention relates to fasteners and my invention, in its broadest aspect, involves an automobile curtain fastener composed of two parts, a post or stationary part and a socket or movable part, the socket being composed of two members assembled to form a novel post receiving socket. This two-part socket is in contradistinction to three or more parts that usually form such a structure, and my improved fastener socket may be characterized in the following particulars.

First, the socket is constructed and designed for opening or removal from a post in one direction only, which is a natural direction for an operator desiring to disconnect an automobile curtain from an automobile top bow, body or other structure. The one-way removal of the socket from a post affords practically a three-way engagement between the post and socket, so that the latter will be firmly retained on the former against accidental displacement.

Second, the two-part socket comprises a very simple, durable and inexpensive construction. The parts can be cut, stamped or pressed from sheet metal, finished to harmonize with other automobile hardware, and easily and quickly assembled relative to a curtain or other piece of textile.

Third, the fastener socket may be constructed for engagement with a post along with another socket, so that two curtains or even more may be held relative to a post of proper length.

The above are a few of the advantages gained by my fastener constructions, and others will undoubtedly appear as the nature of the invention is better understood.

Reference will now be had to the drawing wherein there are illustrated the preferred embodiments of my invention, but in describing my invention in detail, it is to be understood that the structural elements are susceptible to such variations as are permissible by the appended claims.

Figure 1 is a vertical sectional view of one form of fastener;

Fig. 2 is a front elevation of the same partly broken away and partly in section;

Fig. 3 is a rear elevation of the fastener;

Fig. 4 is a vertical sectional view of another form of fastener;

Fig. 5 is a similar view showing both forms of the fasteners cooperating in holding curtains relative to a post;

Fig. 6 is a vertical sectional view of the inner member of the fastener socket;

Fig. 7 is a front elevation of the same;

Fig. 8 is a detail sectional view taken on the line VIII—VIII of Figure 3;

Fig. 9 is a vertical sectional view of still another form of fastener; and

Fig. 10 is a front elevation of the same.

In the drawing, the reference numeral 1 denotes a portion of an automobile top bow, curtain or other support for a post or pin 2 which has a shank 3 terminating in a convex head 4 formed in part by an annular groove 5 in the shank of the post. This constitutes a conventional form of stud or post to which may be attached a socket member which cooperates with the post in constituting a fastener.

6 denotes, by the way of an example, a curtain adapted to be held relative to the top bow 1 and said curtain is provided with an opening 7. Mounted against the inner or rear wall of the curtain 6 is a washer or inner member 8 substantially oval in elevation, and approximately the central portion of said washer is pressed out to form a conical shaped nipple 9 provided with lateral diametrical opposed slits 10 and a vertical slit 11, the slit 11 being approximately ninety degrees from either of the slits 10, with the slit 11 in the lower portion of the nipple so that the lower portion of the nipple is divided into two segment shaped resilient gripping members 12, that may be sprung outwardly. These resilient gripping members have the curved edges thereof rolled to provide beads 13 which round off the edges of said gripping members and lend a degree of rigidity to such edges. The upper portion of the nipple 9 is substantially semi-circular and the semi-circular edge is rolled to form a bead 14 which projects inwardly and somewhat restricts the outer end of the nipple, this being in contra-distinction to the beads 13 which are formed exteriorly of the gripping members 12. The upper portion of the nipple provides a substantially rigid structure and the bead 14 thereof constitutes a fulcrum member as will hereinafter appear.

Enclosing the nipple 9 is an outer member or shell 15 convexo concave and substantially oval in elevation, with its central portion stamped or pressed to provide a boss 16. The edges of the outer member 15 are rounded and inturned to form a flange 17, and at suitable intervals the edge of the outer member or shell 15 is formed with prongs 18. These prongs are adapted to extend through the curtain 6 and slots 19 in the washer 8 to be clenched against the washer, as best shown in Figure 3. The flange 17 abuts the curtain 6 and prevents the edges of the outer member or shell 15 from pressing into the curtain 6 and cutting the same. With the prongs 18 connecting the outer member 15 to the washer or inner member 8 there is formed a socket member having the inturned nipple 9 extending in proximity to the front wall of the outer member 15.

Figure 1 shows the cooperation of the outer member 15 and the inner member 8 in providing an enclosure for the outer end of the post 3. To establish a connected relation between the post and the socket formed by the inner and outer members, the socket is brought down onto the post so that the upper semi-circular bead 14 engages in the upper side of the post groove 5 behind the head 4. Then by pushing downwardly on the lower portion of the socket the gripping members 12 are sprung by the head 4 until said gripping members recede behind the head 4, and in doing so bridge lower portions of the groove 5. The gripping members 12 bind against the post 3 at the side walls of the groove 5, one of said side walls being formed by the head 4, and the gripping action of the members 12 is sufficient to hold the socket on the post without accidental displacement and without rattle of the socket relative to the post.

To remove the socket from the post an upward swing of the lower end of the socket is necessary in order to spring the resilient gripping members 12 and cause the same to ride from under the head 4 and thus permit of the upper portion of the nipple 9 being removed from above the post. Pulling outwardly and upwardly of the lower portion of the curtain causes the gripping members 12 to ride against the head 4 and during this movement the bead 14 fulcrums behind the head 4, in the groove 5, and thus permits of the socket being tilted. As the lower portion of the socket is swung outwardly and upwardly, the gripping members 12 are sprung sufficiently by the head 4 to ride out of engagement therewith and as this movement is accomplished the head 4 is cleared by the socket and may be lifted upwardly and outwardly therefrom. It will thus be noted that the socket has a one-way detachment from the post 3. The upper portion of the socket if shifted outwardly and downwardly will simply tend to more firmly anchor the socket relative to the post, because the semi-circular bead 14 has an extensive seat in the groove 5. If an attempt is made to remove the socket by a sidewise tilting action only one of the gripping members 12 may be affected, and then but partially, not sufficient to permit of removal of the socket in this manner. But, when the lower portion of the socket is swung outwardly and raised the two gripping members 12 are simultaneously sprung and thus release the socket from the post.

Reference will now be had to Figures 4 and 5 showing the outer member 15 of the socket provided with an opening 20 instead of the boss 16 which provides clearance for the post head 4. The opening 20 in the outer member 15 is adapted to receive a long pin, stud or post 21 when the socket member is forced onto the shank of a post, thereby springing the gripping members 12 to a greater extent than heretofore, so that the rigid bead 14 may ride on the upper portion of the shank, and the gripping members 12 frictionally bear against the lower portion of the shank. With this socket member pushed inwardly, placing the curtain 6 contiguous to the top bow 1, another curtain 22 can be attached to the post 21, as shown in Figure 5, with the socket of the curtain 22 preventing displacement of the apertured socket of the curtain 6.

Another form of fastener socket is shown in Figures 9 and 10, where a washer or inner member 23 has a struck out flange or collar 24 extending into the opening 7 to protect the edges of the curtain 6, and at the same time provide a lined curtain opening or an eyelet through which may extend the post 3. The outer member 25 of the socket is of greater convexity so that approximately the central portion thereof may be pressed and slitted inwardly to form a nipple 26, a rigid bead 27, and gripping members 28, such corresponding somewhat to the bead 14 and the members 12 previously described. This arrangement places the nipple as part of the outer member instead of part of the inner member or washer, and the nipple accommodates the head 4 of the post so that it is substantially flush with the socket and presents no protuberances that would mar the general design of the socket. In this latter construction the gripping members 28 are of greater depth than the gripping members 12 so that the inner ends of the gripping members 28 may readily ride against the post head 4 and eventually become seated in the lower portion of the post groove, while the rigid bead 27 engages in the upper portion of the groove and thus provides what I have herein termed, a one-way detachable socket.

I attach considerable importance to the fact that the socket may be only lifted in one direction to remove it from its post, furthermore, to the two-piece socket devoid of detachable springs or other parts requiring careful and accurate workmanship in assembling the parts of the socket. My two-part socket may be easily and quickly attached to an apertured curtain and with the prongs 18 fitting in the slots 19 the outer and inner members are correctly positioned so that there is a socket structure that may be snapped on and off of a headed stud or post.

It is thought that the utility and operation of the fastener will be apparent without further description and of course it may be made of size and finish for other usages than herein set forth.

What I claim is:—

1. In a curtain fastener wherein a socket is adapted to receive a post having a groove in the outer end thereof providing a concave wall and adapted for holding said socket; means in said socket adapted for holding said socket relative to said post, said means including a socket portion seating against the concave wall of said post, and a socket portion spanning the post groove and engaging edges of the groove wall and adapted to be sprung and forced off of the post with the first mentioned socket portion serving as a fulcrum.

2. In a curtain fastener wherein a curtain is adapted to be fastened to a post by a socket member and wherein the socket member has inner and outer members fastened together on said curtain and adapted to receive said post; said inner member comprising a nipple extending through said curtain and having a rigid portion to fulcrum on said post and resilient portions to grip said post, said rigid and resilient portions being formed by splitting said nipple at three places so that said rigid portion is semi-circular and the resilient portions segment shaped.

3. A fastener socket as called for in claim 2, wherein said rigid portion forms the upper part of a nipple and said resilient portions the lower part of said nipple.

4. In a curtain fastener wherein a curtain has an opening and is adapted to be fastened to a rigid grooved stud;—a socket to receive the stud, said socket comprising an inner member mounted on the inner side of the curtain and formed with a split nipple extending through the curtain opening and adapted to receive and hold the stud, said nipple being split to provide a semi-circular rigid fulcrum member and resilient segment shaped gripping members, all of said members having rolled edges so that said stud can ride against said fulcrum member and force said gripping members outwardly until said stud groove is in position to receive said fulcrum and gripping members, and an outer member mounted over the nipple of said inner member and extending through said curtain to hold said inner member in engagement therewith.

5. A curtain fastener as called for in claim 4, wherein said outer member has an opening to permit of a long stud extending therethrough for engagement with the fastener of another curtain.

In testimony whereof I affix my signature.

JAMES F. POWELL.